US012243470B2

(12) United States Patent
Jiang et al.

(10) Patent No.: US 12,243,470 B2
(45) Date of Patent: Mar. 4, 2025

(54) LED DISPLAY DRIVER CHIP WITH ANALOG AND DIGITAL UNITS AND METHOD FOR DRIVING THE SAME

(71) Applicant: PURESEMI Co., Ltd., Nanjing (CN)

(72) Inventors: Zhaoyu Jiang, Nanjing (CN); Ruoping Zhang, Nanjing (CN); Mao Zhao, Nanjing (CN); Junjie Chen, Nanjing (CN)

(73) Assignee: PURESEMI Co., Ltd., Nanjing (CN)

( * ) Notice: Subject to any disclaimer, the term of this patent is extended or adjusted under 35 U.S.C. 154(b) by 0 days.

(21) Appl. No.: 17/802,026

(22) PCT Filed: Apr. 21, 2022

(86) PCT No.: PCT/CN2022/088159
§ 371 (c)(1),
(2) Date: Jul. 20, 2023

(87) PCT Pub. No.: WO2023/134051
PCT Pub. Date: Jul. 20, 2023

(65) Prior Publication Data
US 2024/0221605 A1 Jul. 4, 2024

(30) Foreign Application Priority Data
Jan. 14, 2022 (CN) ......................... 202210042638.6

(51) Int. Cl.
*G09G 3/32* (2016.01)
*G09G 3/20* (2006.01)

(52) U.S. Cl.
CPC ............. *G09G 3/32* (2013.01); *G09G 3/2011* (2013.01); *G09G 3/2014* (2013.01);
(Continued)

(58) Field of Classification Search
CPC ........................................................ G09G 3/32
See application file for complete search history.

(56) References Cited

U.S. PATENT DOCUMENTS 6,437,716 B2 * 8/2002 Nakao .................. G09G 3/3696
345/98
11,854,465 B2 * 12/2023 Yang .................... G09G 3/2081
(Continued)

FOREIGN PATENT DOCUMENTS

CN 208636739 U 3/2019
CN 112636761 A 4/2021
(Continued)

*Primary Examiner* — Chun-Nan Lin

(57) ABSTRACT

The present invention discloses a light-emitting diode (LED) display driver chip and use thereof, which relates to the cross technical field of an integrated circuit and LED display. Based on an existing chip architecture with dual-latch and PWM, the present invention proposes to apply a modulation method of mixing pulse amplitude modulation (PAM) and pulse width modulation (PWM) to a driver chip architecture, to replace an existing PWM control mode, so as to obtain better uniformity of the image grayscale in a small current mode; and use a DAC small current precision control circuit to obtain a more precise current output, to meet the application performance requirements of ultra-high-density LED display, which can process data to achieve a better driving effect, and meet the application performance requirements of ultra-high-density LED display.

10 Claims, 6 Drawing Sheets

(52) U.S. Cl.
CPC ..... *G09G 3/2077* (2013.01); *G09G 2310/027* (2013.01); *G09G 2320/0233* (2013.01)

(56) References Cited

U.S. PATENT DOCUMENTS

| | | | | |
|---|---|---|---|---|
| 2009/0064599 | A1* | 3/2009 | Bennett | E04F 13/0864 52/60 |
| 2022/0230580 | A1* | 7/2022 | Cheng | G09G 3/3233 |
| 2023/0104084 | A1* | 4/2023 | Yang | G09G 3/32 345/691 |
| 2023/0178021 | A1* | 6/2023 | Shin | G09G 3/3233 345/214 |
| 2023/0215352 | A1* | 7/2023 | Kim | H05B 45/33 345/690 |
| 2023/0217561 | A1* | 7/2023 | Kim | G09G 3/3406 315/291 |
| 2023/0217564 | A1* | 7/2023 | Kim | G02F 1/133514 315/291 |
| 2023/0316993 | A1* | 10/2023 | Kim | G09G 3/3406 |
| 2024/0036392 | A1* | 2/2024 | Liu | G09G 3/3406 |
| 2024/0049370 | A1* | 2/2024 | Kim | H05B 45/14 |

FOREIGN PATENT DOCUMENTS

| | | | |
|---|---|---|---|
| CN | 112908244 | A | 6/2021 |
| CN | 113066423 | A | 7/2021 |
| CN | 114067732 | B | 4/2022 |

* cited by examiner

LED DISPLAY DRIVER CHIP WITH ANALOG AND DIGITAL UNITS AND METHOD FOR DRIVING THE SAME

TECHNICAL FIELD

The present invention relates to the cross technical field of an integrated circuit and light-emitting diode (LED) display, and more specifically, to an LED display driver chip and use thereof.

BACKGROUND

With the development of the times, the requirements of electronic products for human-computer interaction have gradually increased. The user can obtain information more intuitively and more conveniently through a display screen. Therefore, the LED display screen is widely applied to more and more use scenarios. At present, the LED display technology has gradually developed, and has transitioned from conventional display to Mini LED display and even Micro LED display. To be specific, the number of pixels per unit area, namely, the density is increasingly high, and therefore new requirements are imposed on display drivers.

In actual use of an LED driver chip, LED units at corresponding positions are often controlled by column driver chips. Considering a size of an LED display unit, only a limited quantity of LED lamp beads on a display panel needs to be controlled in a driver chip design. A current LED pixel pitch is between 0.7 to 5 mm, where products with a pixel pitch below 2.0 mm are referred to as Mini LED display in the industry. The rise of the Mini LED causes a multiple increase in pixels per unit area, and brings the following changes: (1) The increase in pixels leads to an increase in a quantity of used driver chips or an increase in the loading capacity required for a single chip. (2) Factors such as the miniaturization of the LED, the increase in the switch frequency, and the increase in the photoelectric conversion efficiency pose new challenges to both the precision of the output current of the driver chip and the uniformity of the image grayscale in the small current mode.

There are mainly three structures of the existing driver chips: a chip with ordinary constant current output, a chip of a two-stage latch structure with constant current output to improve a refresh rate, or a chip of a structure of frequency multiplication+pulse width modulation (PWM)+static random access memory (SRAM) on-chip storage to enhance a balance between the refresh rate and the grayscale. In terms of the precision of the output current, a chip of an existing architecture is generally adjustable at 0.5 mA. Although some products claim to be capable of handling adjustment at 0.1 mA, briefly, the current precision adjustment still belongs to the mA category.

In the related art, a PWM method is mainly used for modulating an image data signal, and adjusting a pulse width of a PWM wave according to a bit width. A larger bit width indicates a higher display frequency, so that a better display effect can be achieved. However, when the bit width is excessively large, a clock pulse width is narrower and cannot be recognized in a circuit, resulting in a problem of the lack of integrity of the chip or grayscale uniformity in a small current mode. Therefore, in the solution of modulating the image data signal by using the PWM method, it is necessary to balance a distribution relationship between the display effect and the bit width. Under a display condition with a high refresh rate, only a display effect with a bit width less than 10 bits can be achieved, and the performance of the refresh rate and the performance of the bit width cannot be considered simultaneously.

Through search, the Chinese Patent Application No. CN202010402876.4 published on Jul. 31, 2020 and entitled "DRIVE CIRCUIT OF DISPLAY" discloses a drive circuit of a display, where a control unit includes a PWM control unit and a pulse amplitude modulation (PAM) control unit that are independent of each other, the PWM control unit is configured to control a light-emitting time of a light-emitting unit, and the PAM control unit is configured to control a drive current of the light-emitting unit. In this solution, a voltage of a gate G of an MOS transistor is controlled through PAM, to implement pulse width adjustment, which causes the MOS transistor to fail to operate normally when a voltage value is small, resulting in a setting failure. In addition, a PAM signal and a PWM signal control the same point, which causes interference when a signal is flipped and has a large impact on an actual effect. In another example, the Chinese Patent Application No. CN202080012789.6 published on Sep. 14, 2021 and entitled "DISPLAY PANEL AND DRIVING METHOD FOR DISPLAY PANEL" discloses a display panel including a plurality of pixels, including a first pixel circuit for PWM driving a first light-emitting element of a plurality of light-emitting elements and a second pixel circuit for PAM driving a second light-emitting element of the plurality of light-emitting elements, and discloses a method for controlling LED display by combining PAM and PWM. However, this solution needs to be performed in an order of PWM setting, PAM setting, and PWM plus PAM modulating. The PAM and the PWM control the same port and cannot be configured simultaneously, and can only be configured in sequence according to scanning results.

SUMMARY

1. Technical Problem to be Resolved

In view of the existing problems in the related art that an ultra-high-density LED such as a Mini-LED needs to balance a distribution relationship between a display effect and a bit width, and the bit width is greatly limited under a display condition with a high refresh rate, the present invention provides an LED display driver chip and use thereof, which can process data to achieve a better driving effect, meet the application performance requirements of ultra-high-density LED display, and have no limitation on the bit width.

2. Technical Solutions

An objective of the present invention is achieved by using the following technical solutions.

An LED display driver chip is provided, including an analog unit and a digital unit, where the analog unit includes a current reference unit and a constant current output array unit, the digital unit includes an image parameter writing unit, an SRAM unit, and a configurable register unit, the analog unit further includes a DAC (Digital to Analog Converter) small current precision circuit unit for generating a DAC small current and completing precise replication of the DAC small current, and the digital unit further includes a PAM and PWM adjustment unit for PAM and PWM adjustment. Because a required current value of a Micro/Mini-LED is usually equal to or less than 1/10 times the current value of an existing ordinary LED, the current required under this condition is the small current disclosed in the present application. Using the existing structure to process the small current causes a voltage of an MOS transistor (Metal-Oxide-Semiconductor Field-Effect Transistor) to be excessively small and a replica current to be imprecise.

Further, an output reference current (output current) of the current reference unit is outputted from the constant current output array unit through the DAC small current precision circuit unit in the analog unit. The current reference unit is configured to generate a voltage value and a current value inside the chip. The DAC small current precision circuit unit is configured to generate a DAC small current and complete precise replication of the DAC small current, to achieve a better display effect in combination with control of the digital unit. The constant current output array unit is configured to implement current output, to drive multipath LEDs. A reference generation module of the current reference unit completes the generation of a reference voltage and a reference current through structures such as a bandgap reference and a low dropout (LDO) linear regulator. The module may complete the generation according to actual requirements. The constant current output array unit distributes signals generated by previous units to different arrays, to implement multiple output, where the multiple output depends on a quantity of output arrays inside the chip.

Further, an external signal is respectively inputted into the configurable register unit and the image parameter writing unit in the digital unit, the configurable register unit sends data to the PAM and PWM adjustment unit, and the image parameter writing unit sends data to the PAM and PWM adjustment unit through the SRAM unit. The digital unit needs to be controlled by the external signal, for example, a single-chip microcomputer or an FPGA controls an image according to preset software, and a signal is inputted into the analog unit for control after undergoing PAM and PWM adjustment in the digital unit. PAM adjustment resolves a problem of an excessively narrow pulse width caused by a grayscale bit width. By converting values of part of the pulse widths into pulse amplitudes, it is ensured that the linearity is improved in a low grayscale, and control of a larger bit width can be implemented in a case of a normal operation of a circuit.

Further, the DAC small current precision circuit unit includes a DAC small current precision module. The DAC small current precision module implements current adjustment by receiving a relatively small current generated by the current reference unit and combining with control of a digital signal, to implement more precise control of the small current, so that an entire system still maintains a good display effect when the current is small.

Further, a circuit of the DAC small current precision module includes several NMOS transistors connected in parallel, gates of the NMOS transistors are all connected to an input signal D<n> through switches, drains are all connected to an input voltage, and sources are grounded. The DAC small current precision module controls a current value and a voltage value Vds flowing through the NMOS transistor by controlling an input current Iref and an input voltage Vref_d. After the control of the digital signal, voltage control of Mout in an output drive is implemented through outputted voltages Vg, Vd, and pgnd, thereby generating the same current value Iout=Iref.

Further, the PAM and PWM adjustment unit includes a digital conversion module, a status registering module, an output current adjustment module, and several switches; a clock (CLK) signal is connected to the digital conversion module; an instruction signal is connected to the status registering module, for controlling a preset status register to realize different functions, and the status registering module is further connected to the digital conversion module; and a PAM signal outputted by the digital conversion module is connected to the output current adjustment module, and a PWM signal outputted by the digital conversion module is connected to the several switches. The instruction signal passing through the status register is processed together with an inputted CLK signal in the digital conversion module, to obtain a PAM signal and a PWM signal. The PAM signal controls an outputted current value by using the output current adjustment module, and adjusts current values of different pulse amplitudes obtained by the analog unit. The PWM signal controls corresponding switches to reach different pulse widths, and finally synthesizes an output reference current.

Further, a quantity of bit widths controlled by the PWM signal is greater than a quantity of bit widths controlled by the PAM signal.

The present invention discloses a structure for ultra-high-density LED display driver chips, where a DAC small current precision module and a PAM and PWM adjustment unit are arranged through the innovation of digital and analog units, to implement ultra-high-density LED driving. A precise and small current value can be obtained through the structure of the present invention, which is beneficial to LED driving; and better grayscale level regulation can be implemented through the adjustment of a digital signal.

An LED display driving method is provided, including: a reference current generated by a current reference unit of an analog unit, is precise regulated by a DAC small current precision circuit unit to generate a DAC small current, and the DAC small current is modulated by a pulse amplitude modulation (PAM) and pulse width modulation (PWM) adjustment unit of a digital unit and output to a constant current output array unit, to implement multiple output of signals. During driving, different generated current values and different PWM signals are combined for control, and a pulse width and a pulse amplitude are adjusted to finally obtain a final current value. More control situations can be achieved through the adjustment of the digital signal and the precise generation of the DAC small current, so that ultra-high-density LED display can achieve a better effect.

Further, the method includes: controlling, by a DAC small current precision module of the DAC small current precision circuit unit, a gate voltage of an NMOS transistor by using a switch, and selecting, by determining the gate voltage, a quantity of NMOS switches to be increased, to control a current value and a voltage value flowing through the NMOS transistor.

Further, the method includes: setting a quantity of NMOS transistors to generate a current gradient and control a current multiple. To generate a current gradient, a general method is to set a quantity of NMOS transistors, where a quantity of $(n+1)^{th}$ NMOS transistors is a sum of a quantity of $n^{th}$ NMOS transistors and a quantity of $(n-1)^{th}$ NMOS transistors, and n is an integer greater than 1, so as to control a current multiple.

Further, the method includes: adjusting a width/length (W/L) ratio of the NMOS transistor in a case of ensuring that the current value is unchanged, and increasing an area of a first NMOS transistor to ensure normal operation in a case of a small current. In conventional DAC control, W/L ratios of the NMOS transistors usually selected satisfy M0=M1=M2=M3, which is convenient for the drawing of the layout. However, when only D<0> is selected at the switch, the NMOS transistor M0 is insufficient to support the voltage value required by the current, so that the current cannot be precisely replicated. Therefore, in the present invention, the W/L ratios of the transistor M0 and the transistor M3 are adjusted to improve the performance under a condition that the current values remain unchanged. A W/L ratio that W/L=20/2 is used as an example. In the present invention, the W/L ratios of M0 to M3 are set as 20/4, 20/2, 20/2, and 20/1. By increasing an area of the transistor M0, it is ensured that the transistor M0 operates normally in a small current, and a voltage Vgs can be increased to ensure the stability of the transistor M0. In addition, in a large current, current capabilities are also improved due to the increased W/L ratio.

Further, PAM of the PAM and PWM adjustment unit is to perform control by using a current amplitude unit and perform synthesis according to a value of a digital signal, to obtain an output reference current; and PWM of the PAM and PWM adjustment unit is to adjust a corresponding signal pulse width through a CLK and adjust different pulse widths according to a value of a digital signal.

Further, input data includes feature data and image data, the feature data is inputted into a configurable register unit, and the image data is inputted into an SRAM unit through an image parameter writing unit. An input signal of the image parameter writing unit includes image data of a signal that needs to be displayed, and stores the read image signal into the SRAM unit. An input signal of the configurable register unit includes feature data corresponding to the display signal, for example, a grayscale of an image that needs to be displayed during display, a display period, blanking after display, and other functions. The image data that needs to be displayed and the corresponding feature data are associated with each other when being inputted, to ensure that corresponding feature data can be generated for a frame of specific data, so as to achieve a better display effect. The feature data is processed by the configurable register unit and is associated with the corresponding image data, to synthesize a corresponding feature signal through PAM and PWM. The feature signal is used in combination with the analog unit to achieve the final display.

For the use of an ultra-high-density LED, that is, a Mini-LED, the present invention provides a new structure of a driver chip, which provides an internal structure and a working relationship of a chip, so that the chip can process data to achieve a better driving effect. Based on an existing chip architecture with dual-latch and PWM, the present invention proposes to apply a modulation method of mixing PAM and PWM to a driver chip architecture, to replace an existing PWM control mode, so as to obtain better uniformity of the image grayscale in a small current mode; and use a DAC small current precision control circuit to obtain a more precise current output, to meet the application performance requirements of ultra-high-density LED display.

3. Beneficial Effects

Compared with the related art, the present invention has the following advantages:

The present invention innovatively designs an LED display driver chip for ultra-high-density LED display, including a DAC small current precision module and a PAM and PWM adjustment unit, to implement a solution suitable for driving ultra-high-density LED display. In the present invention, a smaller and more precise drive current can be realized by the setting of a structure of the driver chip, and data including more information can be obtained according to the regulation of a digital signal.

In the present invention, the innovative structure is used for realizing a smaller current value in an LED display module, so that more drive outputs can be realized, and a grayscale level of LED display is adjusted with the adjustment of the digital signal. The use of PAM is beneficial to resolve the problems of poor low-grayscale linearity and incomplete signal determination caused by conventional PWM, effectively improve a grayscale bit width, and achieve a better display effect, so that the performance of a refresh rate and the performance of a bit width can be considered simultaneously. The PAM and PWM of the present invention can be simultaneously adjusted, and the adjustment can be completed according to actual requirements.

Compared with the conventional LED display driver chip, the present invention is mainly oriented to the field of ultra-high-density LED display, that is, the field of a new LED mainly dominated by a Mini-LED. By using the chip structure described in the present invention, the ultra-high-density LED display effect can be significantly improved, and a better display effect can be achieved. In addition, units in the architecture can be adjusted or the digital signal can be set according to actual requirements, to realize more functions.

REFERENCE NUMERALS

100. Reference generation module; 101. DAC small current precision module; 102. Constant current output array unit; 200. Configurable register unit; 201. Image parameter writing unit; 202. SRAM unit; 203. PAM and PWM adjustment unit.

DETAILED DESCRIPTION

The present invention is described in detail below with reference to the accompanying drawings and specific embodiments.

Embodiments

Figure 1:
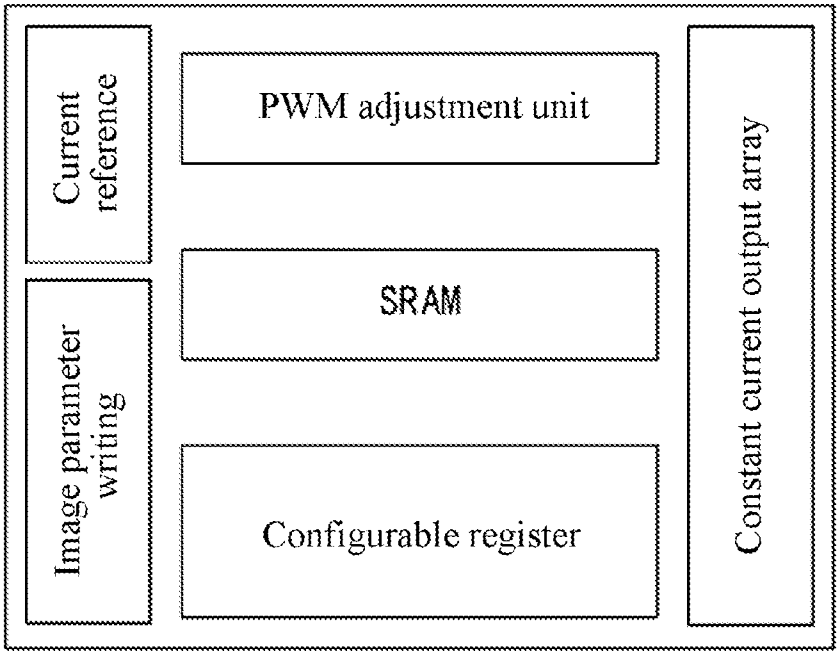
FIG. 1 is a schematic diagram of a technical solution commonly used in the related art.

In the related art, an architecture of an LED driver chip is shown in FIG. 1, including a current reference unit, an image parameter writing unit, a PWM adjustment unit, an SRAM unit, a configurable register unit, and a constant current output array unit. Data is inputted into the driver chip through the current reference unit and the image parameter writing unit, and is outputted from the constant current output array unit through the PWM adjustment unit, the SRAM unit, and the configurable register unit. In such a structure of the related art, the regulation of the output data is mainly to adjust a fixed reference current by the PWM adjustment unit, to achieve the effect of constant current output.

Figure 2:
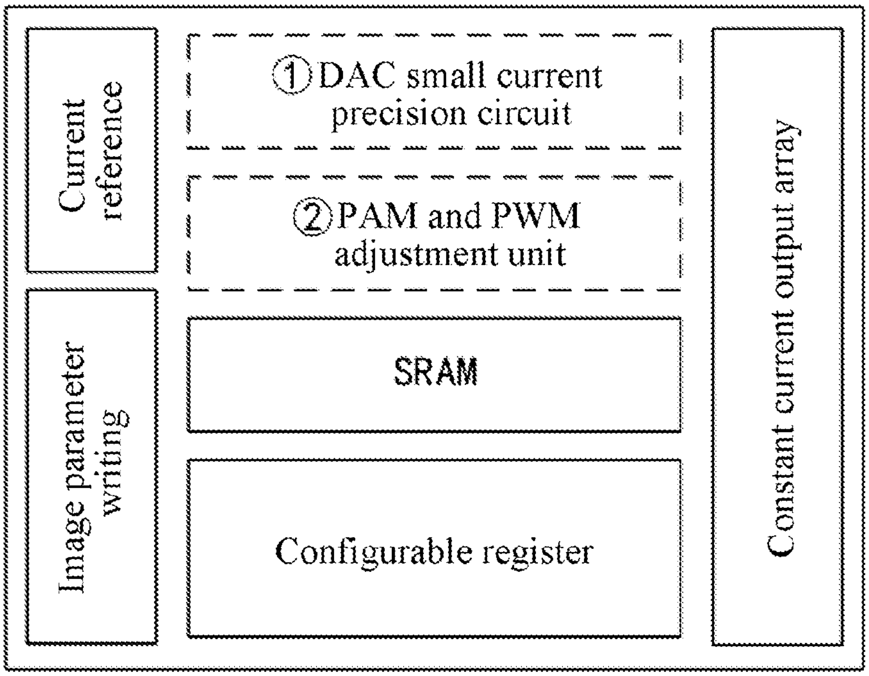
FIG. 2 is a schematic structural diagram of a chip according to the present invention.

This embodiment discloses an LED display driver chip, which can be oriented to an ultra-high-density Micro/Mini LED display drive, and a structure of the LED display driver chip is shown in FIG. 2. Based on the current reference unit, the image parameter writing unit, the configurable register unit, the SRAM unit, and the constant current output array unit in the related art, a DAC small current precision circuit unit and a PAM and PWM adjustment unit are added, input data is controlled and adjusted jointly by the DAC small current precision circuit unit and the PAM and PWM adjustment unit, and new solutions are provided for both analog and digital parts.

Figure 3:
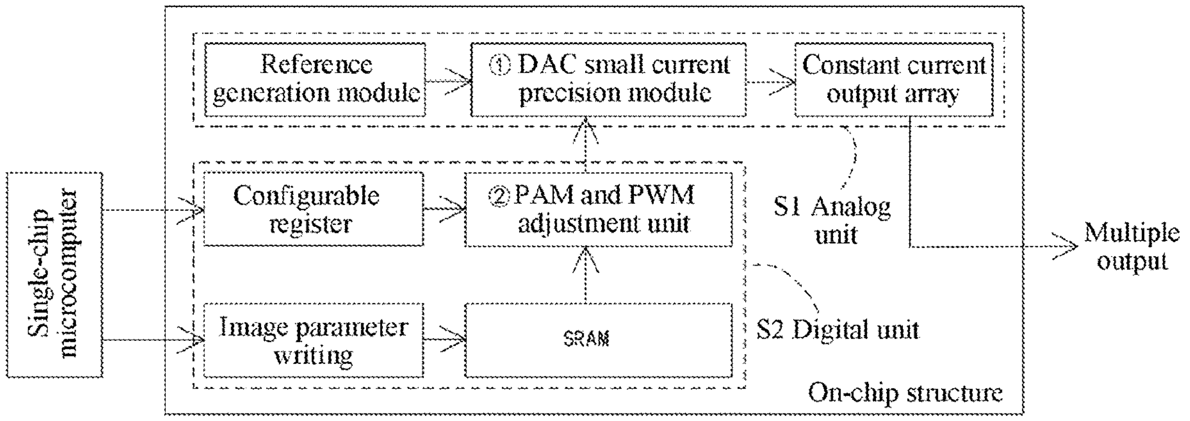
FIG. 3 is a schematic diagram of internal operation of a chip according to the present invention.

A schematic diagram of internal operation of a driver chip of this embodiment is shown FIG. 3, including an analog unit and a digital unit. The analog unit includes a reference generation module 100 of the current reference unit, a DAC small current precision module 101 of the DAC small current precision circuit unit, and a constant current output array unit 102. An output signal of the reference generation module 100 is outputted from the constant current output array unit 102 through the DAC small current precision module 101. The digital unit includes a configurable register unit 200, an image parameter writing unit 201, an SRAM unit 202, and a PAM and PWM adjustment unit 203. The configurable register unit 200 is connected to the PAM and PWM adjustment unit 203, the image parameter writing unit 201 is connected to the SRAM unit 202, the SRAM unit 202 is further connected to the PAM and PWM adjustment unit 203, and the configurable register unit 200 and the image parameter writing unit jointly receive input data of an external single-chip microcomputer.

Figure 4:
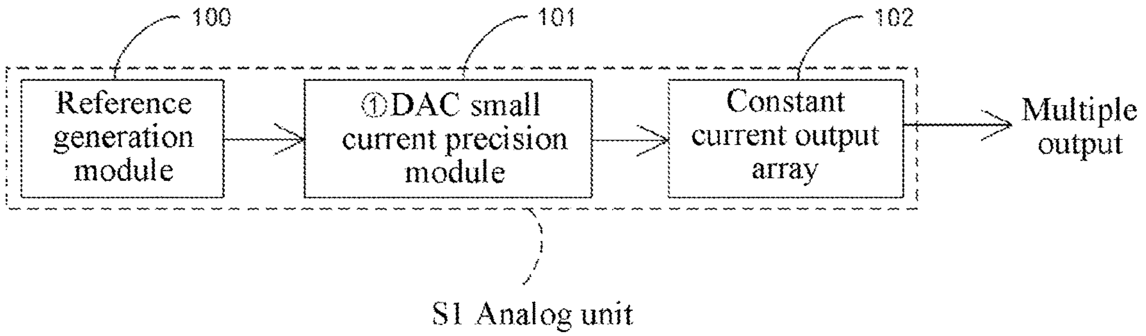
FIG. 4 is a schematic diagram of an analog unit of a chip according to the present invention.

A structure of the analog unit is shown in FIG. 4, including a reference generation module 100, a DAC small current precision module 101, and a constant current output array unit 102. The reference generation module 100 of the analog unit controls a voltage value and a current value inside the driver chip, to meet internal operation conditions of the driver chip. Subsequently, through internal and external control, the generation of a DAC small current is completed, and the precise regulation of the current value is implemented through the DAC small current precision module 101, so as to achieve a better display effect. An input signal can drive the constant current output array unit 102 through precise generation of the DAC small current and by combining with a control signal of the digital unit. The driving can implement multiple output and ensure the simplicity of the entire driving structure.

The reference generation module 100 completes the generation of a reference voltage and a reference current through structures such as a bandgap reference and an LDO linear regulator. The module is designed to complete the generation according to actual requirements. Based on the related art, in this embodiment, the DAC small current precision module 101 is innovatively used for receiving a relatively small current generated by the reference generation module 100, and combining with control of a digital signal to adjust a current, so that the DAC small current precision module can control the small current more precisely, and an entire system still maintains a good display effect when the current is small. The constant current output array unit 102 receives signals outputted by the DAC small current precision module 101 and distributes the signals to different arrays, to implement multiple output. The multiple output depends on a quantity of output arrays inside the driver chip. When the quantity of arrays is excessively large, driving capabilities of the DAC small current precision module 101 and the reference generation module 100 need to be correspondingly improved, but basic logic thereof remains unchanged.

Figure 5:
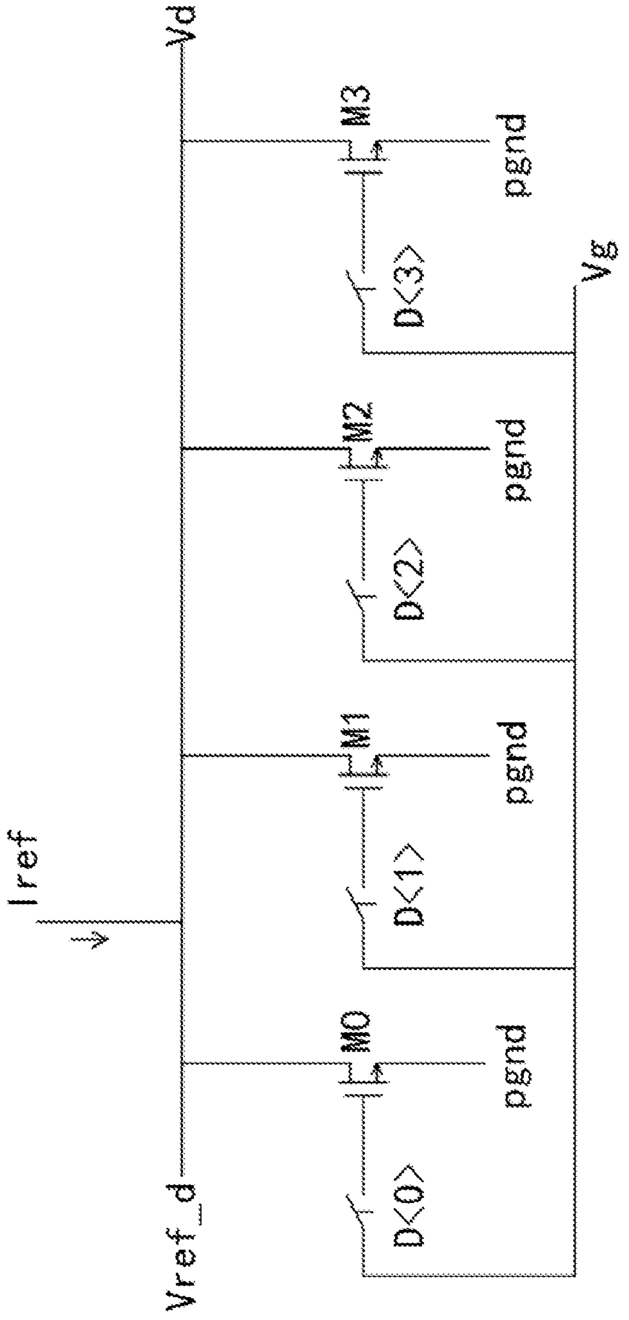
FIG. 5 is a schematic diagram of a circuit of a DAC small current precision module according to the present invention.
Figure 6:
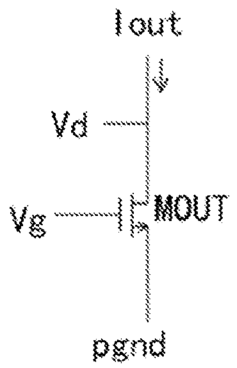
FIG. 6 is a schematic diagram of an equivalent circuit of a circuit of a DAC small current precision module according to the present invention.

A schematic diagram of a circuit of the DAC small current precision module 101 is shown in FIG. 5, and the circuit includes several NMOS transistors connected in parallel, gates of the NMOS transistors are all connected to an input signal D<n> through switches, drains are all connected to an input voltage Vref_d, and sources are grounded. For ease of understanding, a 4-bit signal is used as an example for description in this embodiment, that is, signals are represented as D<0>, D<1>, D<2>, and D<3> respectively. In this case, as shown in FIG. 5, the circuit of the DAC small current precision module 101 includes four NMOS transistors M0, M1, M2, and M3 connected in parallel. Current values and voltage values Vds flowing through the NMOS transistors M0 to M3 are controlled by controlling an input current Iref and an input voltage Vref_d, gate voltages of the NMOS transistors need to be controlled by only the switches, and a quantity of NMOS switches to be increased is selected by determining the gate voltages. To generate a current gradient, a general method is to set a quantity of NMOS transistors, where quantities m of M0 to M3 are 1, 1, 2, and 4, that is, a quantity of $(n+1)^{th}$ NMOS transistors is a sum of a quantity of $n^{th}$ NMOS transistors and a quantity of $(n-1)^{th}$ NMOS transistors, and n is an integer greater than 1, so as to control a current multiple. With reference to an equivalent circuit in FIG. 6, after the control of the digital signal, voltage control of Mout in an output drive may be precisely implemented through voltages Vg, Vd, and pgnd outputted from MOS transistors, thereby generating the same current value Iout=Iref.

As shown in FIG. 5, in conventional DAC control, W/L ratios of the NMOS transistors usually selected satisfy M0=M1=M2=M3, which is convenient for the drawing of the layout. However, when only D<0> is selected at the switch, the NMOS transistor M0 is insufficient to support the voltage value required by the current, so that the current cannot be precisely replicated. Therefore, in the present invention, the W/L ratios of the transistor M0 and the transistor M3 are adjusted to improve the performance under a condition that the current values remain unchanged. A W/L ratio that W/L=20/2 is used as an example. In the present invention, the W/L ratios of M0 to M3 are set as 20/4, 20/2, 20/2, and 20/1. By increasing an area of the transistor M0, it is ensured that the transistor M0 operates normally in a small current, and a voltage Vgs can be increased to ensure the stability of the transistor M0. In addition, in a large current, current capabilities are also improved due to the increased W/L ratio.

Figure 7:
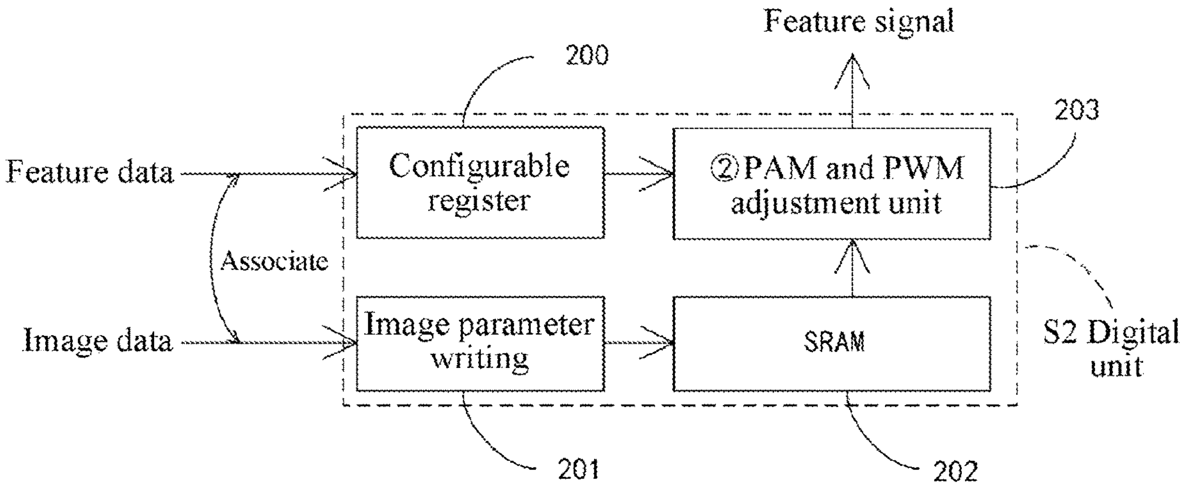
FIG. 7 is a schematic diagram of a digital unit of a chip according to the present invention.

A structure of a digital unit is shown in FIG. 7, including a configurable register unit 200, an image parameter writing unit 201, a SRAM unit 202, and a PAM and PWM adjustment unit 203. PAM represents pulse amplitude modulation, and PWM represents pulse width modulation. Signals are inputted into the configurable register unit 200 and the image parameter writing unit 201 of the digital unit by an external single-chip microcomputer, data received by the image parameter writing unit 201 includes a signal that needs to be displayed, that is, image data, and the read image data is stored in the SRAM unit 202. Data received by the configurable register unit 200 is display data corresponding to the display signal received by the image parameter writing unit 201, that is, feature data, for example, a grayscale of an image that needs to be displayed during display, a display period, blanking after display, and other functions. PAM and PWM adjustment is performed on the signal by the PAM and PWM adjustment unit 203, and the adjusted signal is outputted to an analog unit, to control the analog unit.

The digital unit is controlled by the signal of the external single-chip microcomputer. The external signal is from a single-chip microcomputer or an FPGA that controls an image according to preset software. The external signal includes feature data and image data. The image data is the signal that needs to be displayed and that is received by the image parameter writing unit 201, and the feature data is the display data received by the configurable register unit 200. The image data that needs to be displayed and the feature data are associated with each other when being inputted, to ensure that corresponding feature data can be generated for a frame of specific data, so as to achieve a better display effect.

As shown in FIG. 7, the image data is inputted into the image parameter writing unit 201 in the driver chip. Due to a relatively large amount of image data, the SRAM unit 202 needs to be preset in the driver chip to store corresponding image data. The feature data corresponding to the image data is processed by the configurable register unit 200 and is associated with the corresponding image data, to synthesize a corresponding feature signal through PAM and PWM performed by the PAM and PWM adjustment unit 203. The feature signal is used in combination with the analog unit to achieve the final display.

Figure 8:
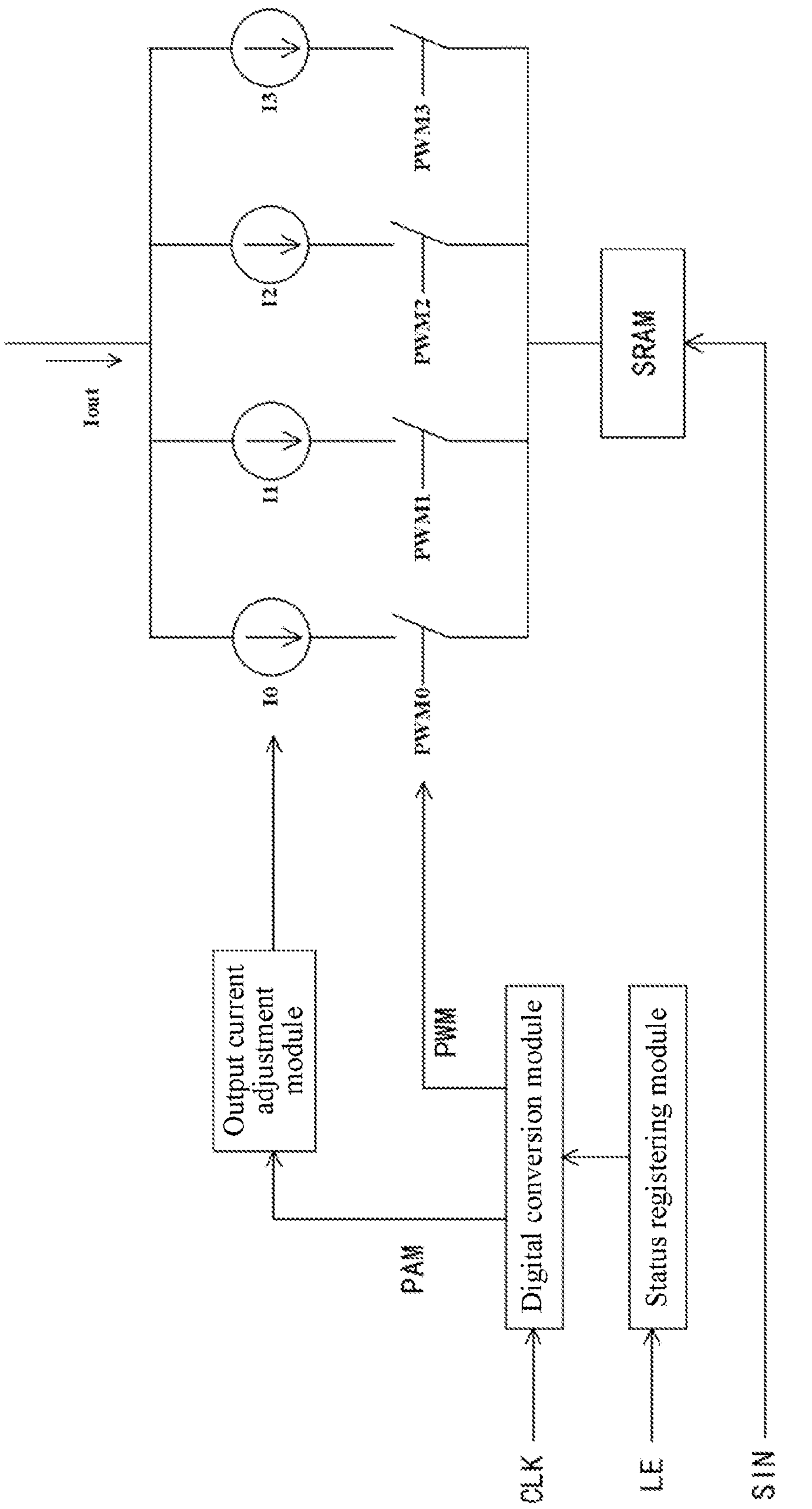
FIG. 8 is a schematic architectural diagram of a PAM and PWM adjustment unit according to the present invention.

An architecture of the PAM and PWM adjustment unit 203 is shown in FIG. 8. The PAM and PWM adjustment unit 203 includes a digital conversion module, a status registering module, an output current adjustment module, and several switches. Input signals of the driver chip include a CLK signal, an input data signal SIN, and an instruction signal LE. The instruction signal LE is inputted into the status registering module, for controlling a preset status register to realize different functions, and the CLK signal is inputted into the digital conversion module. After the instruction signal LE is inputted, different functions are realized by the status registering module. After a converted signal is obtained, the converted signal is processed together with the CLK signal in the digital conversion module, to obtain a PAM signal and a PWM signal. The PAM signal controls an outputted current value by using the output current adjustment module, and adjusts current values of different pulse amplitudes obtained by the DAC small current precision module. The PWM signal controls corresponding switches to reach different pulse widths, and finally synthesizes an output reference current Iout.

Figure 9:
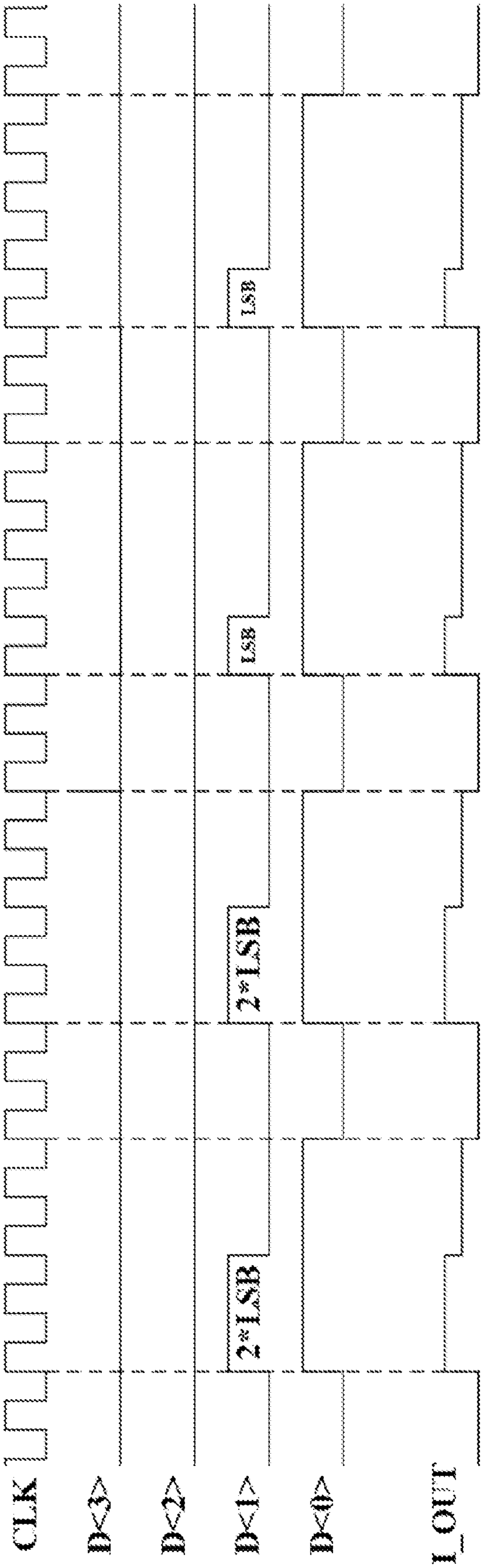
FIG. 9 is a schematic diagram of a PAM and PWM adjustment unit according to the present invention.

As shown in FIG. 9, the PAM and PWM adjustment unit 203 involved in this embodiment expands PWM in a conventional driver chip and introduces PAM to resolve a problem of signal loss caused by an excessively narrow pulse width in a low grayscale and insufficient subsequent driving time. In addition, because a bit width is directly related to the PWM signal, when the bit width is excessively large, a frequency is excessively large, resulting in a failure in normal operation. PAM and PWM are combined to eliminate, by using pulse amplitudes, the impact caused by excessively small bit widths. After the pulse amplitudes are divided, processing of larger bit widths and smaller grayscale levels is implemented. Most of the bit widths are still controlled by PWM, while a small part of the bit widths are controlled by PAM. A quantity of bit widths controlled by PWM is greater than a quantity of bit widths controlled by PAM, and a final effect is achieved by controlling the amplitude and the pulse width.

FIG. 9 shows an embodiment of a PAM and PWM adjustment unit 203 of this embodiment. For ease of description, FIG. 9 is matched with the analog unit, and a 4-bit signal D<0:3> is set. PAM is to perform control by using a current amplitude unit and perform synthesis according to a final value of a digital signal, to obtain a final output I_OUT. As shown in the figure, I_OUT=I_D<0>+I_D<1>+I_D<2>+I_D<3>, which can be adjusted by a single pulse amplitude to obtain larger I_OUT during application. PWM is to adjust a corresponding signal pulse width through a CLK and adjust different pulse widths according to a value of a digital signal. As shown in the figure, D<1> can adjust the pulse width through control. The smallest signals are allocated in different periods, to adjust the pulse width. More control situations can be achieved through the adjustment of the digital signal and the precise generation of the DAC small current, so that ultra-high-density LED display can achieve a better effect.

The foregoing has schematically described the present invention and its implementation, but the description is not restrictive. As described in the specification and accompanying drawings of the present invention, the production of actual sample chips is completed and the sample chips have been tested for many times. It is verified that through a plurality of tests, the chip architecture can achieve the expected purpose and effect, and the actual performance and efficacy thereof are beyond doubt. The foregoing descriptions are merely exemplary embodiments of the present invention, and does not limit the patent scope of the present invention. All equivalent structure or process changes made according to the content of this specification and accompanying drawings in the present invention or by directly or indirectly applying the present invention in other related technical fields or equivalent examples that use the design content of the present invention to make changes or modifications shall fall within the protection scope of the present invention.

What is claimed is:

1. A light-emitting diode (LED) display driver chip, comprising an analog unit and a digital unit, wherein the analog unit comprises a current reference unit, a constant current output array unit, and a Digital to Analog Converter (DAC) small current precision circuit unit configured to generate a DAC small current and complete precise replication of the DAC small current, wherein the digital unit comprises an image parameter writing unit, a static random access memory (SRAM) unit, a configurable register unit, and a pulse amplitude modulation (PAM) and pulse width modulation (PWM) adjustment unit configured to perform PAM and PWM adjustment, wherein the PAM and PWM adjustment unit in the digital unit is connected to the analog unit, wherein an output reference current of the current reference unit is outputted from the constant current output array unit through the DAC small current precision circuit unit in the analog unit, wherein the DAC small current precision circuit unit comprises a DAC small current precision module, and wherein a circuit of the DAC small current precision module comprises several N-channel Metal-Oxide-Semiconductor (NMOS) transistors connected in parallel, gates of the NMOS transistors are all connected to an input signal D<n> through switches, drains are all connected to an input voltage, and sources are grounded.

2. The LED display driver chip according to claim 1, wherein, in the digital unit, the image parameter writing unit receives data including image data, and the image data is stored in the SRAM unit.

3. The LED display driver chip according to claim 1, wherein the PAM and PWM adjustment unit in the digital unit is connected to the DAC small current precision circuit unit in the analog unit.

4. A light-emitting diode (LED) display driver chip, comprising an analog unit and a digital unit, wherein the analog unit comprises a current reference unit, a constant current output array unit, and a Digital to Analog Converter (DAC) small current precision circuit unit configured to generate a DAC small current and complete precise replication of the DAC small current, wherein the digital unit comprises an image parameter writing unit, a static random access memory (SRAM) unit, a configurable register unit, and a pulse amplitude modulation (PAM) and pulse width modulation (PWM) adjustment unit configured to perform PAM and PWM adjustment, wherein the PAM and PWM adjustment unit in the digital unit is connected to the analog unit, wherein an output reference current of the current reference unit is outputted from the constant current output array unit through the DAC small current precision circuit unit in the analog unit, wherein an external signal is respectively inputted into the configurable register unit and the image parameter writing unit in the digital unit, the configurable register unit sends data to the PAM and PWM adjustment unit, and the image parameter writing unit sends data to the PAM and PWM adjustment unit through the SRAM unit, and wherein the PAM and PWM adjustment unit comprises a digital conversion module, a status registering module, an output current adjustment module, and several switches; a clock (CLK) signal is connected to the digital conversion module; an instruction signal is connected to the status registering module, for controlling a preset status register to realize different functions, and the status registering module is further connected to the digital conversion module; and a PAM signal outputted by the digital conversion module is connected to the output current adjustment module, and a PWM signal outputted by the digital conversion module is connected to the several switches.

5. The LED display driver chip according to claim 4, wherein a quantity of bit widths controlled by the PWM signal is greater than a quantity of bit widths controlled by the PAM signal.

6. A light-emitting diode (LED) display driving method, comprising:

generating a reference current, by a current reference unit of an analog unit;

regulating the reference current, by a Digital to Analog Converter (DAC) small current precision circuit unit, to generate a DAC small current;

modulating the DAC small current, by a pulse amplitude modulation (PAM) and pulse width modulation (PWM) adjustment unit of a digital unit, and outputting the DAC small current to a constant current output array unit to form a drive current and achieve multi-channel signal output; and controlling, by a DAC small current precision module of the DAC small current precision circuit unit, a gate voltage of a N-channel Metal-Oxide-Semiconductor (NMOS) transistor by using a switch, and selecting, by determining the gate voltage, to increase a number of NMOS being switched to control a current value and a voltage value flowing through the NMOS transistor.

7. The LED display driving method according to claim 6, comprising: setting a quantity of NMOS transistors to generate a current gradient and control a current multiple.

8. The LED display driving method according to claim 7, comprising: adjusting a width/length (W/L) ratio of the NMOS transistor in a case of ensuring that the current value is unchanged, and increasing an area of a first NMOS transistor to ensure normal operation in a small current.

9. The LED display driving method according to claim 6, wherein PAM of the PAM and PWM adjustment unit is to perform control by using a current amplitude unit and perform synthesis according to a value of a digital signal, to obtain an output reference current; and PWM of the PAM and PWM adjustment unit is to adjust a corresponding signal pulse width through a clock (CLK) and adjust different pulse widths according to a value of a digital signal.

10. The LED display driving method according to claim 6, wherein input data comprises feature data and image data, the feature data is inputted into a configurable register unit, and the image data is inputted into a static random access memory (SRAM) unit through an image parameter writing unit.

* * * * *